US012705685B1

(12) United States Patent
Gupta et al.

(10) Patent No.: US 12,705,685 B1
(45) Date of Patent: Aug. 11, 2026

(54) SINGLE IMAGE MANIPULATION

(71) Applicant: Deep Media Inc., Oakland, CA (US)

(72) Inventors: Rijul Gupta, Oakland, CA (US); Parag Chordia, Oakland, CA (US)

(73) Assignee: Deep Media Inc., Oakland, CA (US)

( * ) Notice: Subject to any disclaimer, the term of this patent is extended or adjusted under 35 U.S.C. 154(b) by 542 days.

(21) Appl. No.: 17/666,982

(22) Filed: Feb. 8, 2022

Related U.S. Application Data

(60) Provisional application No. 63/250,459, filed on Sep. 30, 2021, provisional application No. 63/146,983, filed on Feb. 8, 2021.

(51) Int. Cl.

| | |
|---|---|
| ***G16H 30/40*** | (2018.01) |
| ***G06N 3/08*** | (2023.01) |
| ***G06N 20/00*** | (2019.01) |
| ***G06T 3/00*** | (2006.01) |
| ***G06T 7/30*** | (2017.01) |

(Continued)

(52) U.S. Cl.
CPC ................ *G06T 3/00* (2013.01); *G06N 3/08* (2013.01); *G06T 7/30* (2017.01); *G06T 7/337* (2017.01); *G06V 10/761* (2022.01); *G06V 10/82* (2022.01); *G06V 40/174* (2022.01); *G06T 2207/10016* (2013.01); *G06T 2207/20081* (2013.01); *G06T 2207/20084* (2013.01); *G06T 2207/20132* (2013.01)

(58) Field of Classification Search
CPC .. G06T 3/00; G06T 7/30; G06T 7/337; G06T 2207/10016; G06T 2207/20081; G06T 2207/20084; G06T 2207/20132; G06N 3/08; G06V 10/761; G06V 10/82; G06V 40/174
See application file for complete search history.

(56) References Cited

U.S. PATENT DOCUMENTS 10,552,977 B1 * 2/2020 Theis ........................ G06T 7/70
11,582,519 B1 * 2/2023 Bhat .................. H04N 21/4666
(Continued)

OTHER PUBLICATIONS

Zhou et al., Photorealistic Facial Expression Synthesis by the Conditional Difference Adversarial Autoencoder, 2017, IEEE computer society (Year: 2017).*
(Continued)

*Primary Examiner* — Amandeep Saini
*Assistant Examiner* — Mehrazul Islam
(74) *Attorney, Agent, or Firm* — Anton J. Hopen; Trenam Law

(57) ABSTRACT

Embodiments relate to a system which includes a training generator configured to: slice an input source file into source file time series crops, slice an input source reference file into source reference file time series crops corresponding to the source file time series crops. The system includes a dynamic flow detector configured to: determine a first flow output and a second flow output. The system includes an identity detector configured to: determine a first identity output and a second identity output. The system includes a generative preprocessor to generate a preprocessor output and a target crop generator configured to receive the preprocessor output, apply the preprocessor output to generate a target crop, adjust a vector of the target crop generator to minimize a loss metric, and apply a motion extracted from a new source file to a new target file.

18 Claims, 11 Drawing Sheets

(51) Int. Cl.

| | |
|---|---|
| ***G06T 7/33*** | (2017.01) |
| ***G06V 10/74*** | (2022.01) |
| ***G06V 10/82*** | (2022.01) |
| ***G06V 40/16*** | (2022.01) |
| ***G16H 50/20*** | (2018.01) |

(56) References Cited

U.S. PATENT DOCUMENTS

| | | | | |
|---|---|---|---|---|
| 2010/0118205 | A1* | 5/2010 | Sohma | H04N 5/147<br>348/700 |
| 2018/0232128 | A1* | 8/2018 | Son | G06F 3/04842 |
| 2020/0097767 | A1* | 3/2020 | Perry | G06V 40/165 |
| 2020/0234034 | A1* | 7/2020 | Savchenkov | G06V 40/175 |
| 2021/0150793 | A1* | 5/2021 | Stratton | H04N 21/234 |
| 2021/0269046 | A1* | 9/2021 | Hashimoto | G06V 40/174 |
| 2021/0319809 | A1* | 10/2021 | Lin | G10L 21/0208 |
| 2022/0198617 | A1* | 6/2022 | Gafni | G06V 40/174 |

OTHER PUBLICATIONS

Song et al., Geometry Guided Adversarial Facial Expression Synthesis, Dec. 10, 2017, (Year: 2017).*

* cited by examiner

Source Video Crop 110B
Ref. 1B
Ref. 2B
...
Source Video Crop 110D
Ref. 1D
Ref. 2D
...
Dynamic Flow Detector 112
Flow Output
Flow Output
Flow Output
...
Flow Output
Flow Output
Flow Output
...
211
213
215
217

400

SINGLE IMAGE MANIPULATION

CROSS-REFERENCE TO RELATED APPLICATIONS

This nonprovisional application claims priority to provisional application No. 63/146,983, entitled "Single Image Manipulation," filed Feb. 8, 2021 by the same inventors. This nonprovisional application also claims priority to provisional application No. 63/250,459, entitled "System and Method for Facial Processing," filed Sep. 30, 2021 by the same inventors.

BACKGROUND OF THE INVENTION

1. Field of the Invention

This invention relates, generally, to media manipulation.

2. Brief Description of the Prior Art

Manipulation of videos and images may involve the manipulation of a single frame or group of frames from a first state to a second state. Some forms of manipulation also include coordination and/or generation of audio with video or images in a form or manner not communicated in the original file.

Some forms of image manipulation include Generative Adversarial Networks (GANs). These networks include a generator and a discriminator that have engaged in significant training to produce realistic media manipulation. These GANs, however, require training on the features of a target subject to produce realistic manipulations of the target subject. Training often times includes tens of thousands of input media before the GAN can produce a realistic output having a realistic, yet artificial manipulation of a target subject in an input media file. The training period can take months.

Accordingly, what is needed is a system and method for transforming the identifiable attributes of an unseen target subject based on identifiable attributes an unseen source subject. However, in view of the art considered as a whole at the time the present invention was made, it was not obvious to those of ordinary skill in the field of this invention how the shortcomings of the prior art could be overcome.

All referenced publications are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply.

While certain aspects of conventional technologies have been discussed to facilitate disclosure of the invention, Applicants in no way disclaim these technical aspects, and it is contemplated that the claimed invention may encompass one or more of the conventional technical aspects discussed herein.

The present invention may address one or more of the problems and deficiencies of the prior art discussed above. However, it is contemplated that the invention may prove useful in addressing other problems and deficiencies in a number of technical areas. Therefore, the claimed invention should not necessarily be construed as limited to addressing any of the particular problems or deficiencies discussed herein.

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

BRIEF SUMMARY OF THE INVENTION

The long-standing but heretofore unfulfilled need for a system and method for transforming the identifiable attributes of an unseen target subject based on identifiable attributes an unseen source subject is now met by a new, useful, and nonobvious invention. Likewise, the long-standing but heretofore unfulfilled need for a system and method to manipulate the facial and mouth movements and expressions of an unseen target subject given a set of desired facial and mouth movements and expressions from an unseen source subject is now met by a new, useful, and nonobvious invention.

The method of manipulating digital media includes receiving a target media file and a source media file. In some embodiments, each of the source media files and the target media files are still images or videos.

The target media file includes a target subject, and the source media file includes a source subject. In some embodiments, the source subject and the target subject are different.

Some embodiments include cropping the source media file to produce a series of cropped source media files. For each cropped source media file, the system identifies a predetermined identifiable attribute of the input source subject. An attribute detector then determines changes in the identifiable attribute of the source subject between the series of cropped source media files and storing the determined changes as computer-readable data.

The method further includes providing at least a generator from a trained transformation generative adversarial network (GAN), wherein the transformation GAN has been trained on at least one reference subject. In some embodiments, the target subject and the source subject are not intentionally the same as the at least one reference subject on which the transformation GAN has been trained. In some embodiments, the transformation GAN has been trained on at least 50,000 media files. In some embodiments, transformation GAN has not previously trained on the target subject.

The method of the present invention further includes providing the computer-readable data of the changes in the identifiable attribute of the source subject between the series of cropped input source media files to the generator. The generator then produces a transformed media file from the generator. The transformed media file includes transformations to the target subject corresponding to changes in the identifiable attribute of the source subject.

In some embodiments, the transformation GAN was trained using a discriminator that compares a transformed media file to the source media file and computes a percent error between one or more features of the target subject in the transformed media file and the source subject in the source media file. Once the percent error meets a threshold, the transformation GAN is considered ready for use by a user. In some embodiments, the threshold for the percent error is less than or equal to at least 20% error.

In some embodiments, the attribute detector is a dynamic flow detector configured to detect movement of at least a portion of the source subject between two or more cropped source media files. In some embodiments, the attribute detector is an identity detector configured to detect changes in identity characteristics of the source subject between two or more cropped source media files.

In some embodiments, the identifying the predetermined identifiable attribute includes identity characteristics and movement of at least a portion of the source subject between two or more cropped source media files and the attribute detector includes both an identity detector configured to detect changes in the identity characteristics of the source subject between two or more cropped source media files and a dynamic flow detector configured to detect the movement of at least the portion of the source subject between two or more cropped source media files.

Some embodiments further include creating reference files for each cropped source media files. Each reference file corresponds to an identifiable attribute and the step of determining changes in the identifiable attribute of the source subject is performed on each reference file.

Some embodiments further include analyzing the cropped source media files and determining which of the cropped source media files includes the source subject most similarly aligned to the alignment of the target subject in the target media file. Some embodiments further include analyzing the cropped source media files and determining which of the cropped source media files includes the source subject with the most similar facial expression to the target subject in the target media file. Some embodiments further include identifying the cropped source media file with the most similar subject alignment and facial expression as a starter image to be provided to the generator. This starter image is used by the alignment processor for a pre-processing/alignment step. All the source media crops are run through the dynamic flow detector and the outputs of the dynamic flow detector are compared to the target input. Then, the source input crops are mathematically normalized to better match the target input. Unlike conventional approaches, the normalization does not occur from information based on the image/pixel/facial structure/meta info/etc. This normalization comes from information gathered from the dynamic flow detector.

Some embodiments include aligning the cropped source media files so that a face of the source subject is forward facing in each of the cropped source media files. Some embodiments include further transforming the final transformed media file to reverse the aligning that was performed on the cropped source media files.

A media transformation system comprises an input source. The input source is configured to provide the target media file and the source media file. Some embodiments of the system further include a cropping module configured to crop the source media file to produce a series of cropped source media files. Some embodiments of the system also include a first attribute detector configured to identify changes in identity characteristics of the source subject between two or more cropped source media files and store the determined changes as computer-readable data. Some attribute detectors may not identify changes from one frame to another but may perform an initial detection on one or more frames.

The system further includes at least a generator from a trained transformation generative adversarial network (GAN). The transformation GAN was trained using the generator and a discriminator. In some embodiments, the transformation GAN has been trained on at least one reference subject and the target subject and the source subject are not intentionally the same as the at least one reference subject on which the transformation GAN has been trained.

The generator is configured to receive the computer-readable data of the changes in the identifiable attribute of the source subject between the series of cropped input source media files and produce a transformed media file. The transformed media file includes transformations to the target subject corresponding to changes in the identifiable attribute of the source subject.

The discriminator is configured to compare the transformed media file to the source media file and computing a percent error between one or more features of the target subject in the transformed media file and the source subject in the source media file. When the percent error meets a threshold, the system outputs a final transformed media file.

Some embodiments include a second attribute detector in the form of a dynamic flow detector configured to detect movement of at least a portion of the source subject between two or more cropped source media files.

Some embodiments include a reference file generator configured to create reference files for each cropped source media files. Each reference file corresponds to an identifiable attribute and the step of determining changes in the identifiable attribute of the source subject is performed on each reference file.

Some embodiments further include an alignment processor configured to align the cropped source media files so that a face of the source subject is forward facing in each of the cropped source media files. Some embodiments further include a post processor configured to further manipulate the final transformed media file to reverse the aligning that was performed on the cropped source media files.

These and other important objects, advantages, and features of the invention will become clear as this disclosure proceeds.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

For a fuller understanding of the invention, reference should be made to the following detailed description, taken in connection with the accompanying drawings, in which.

manner not communicated in the original file.

DETAILED DESCRIPTION OF THE INVENTION

Figure 1A:
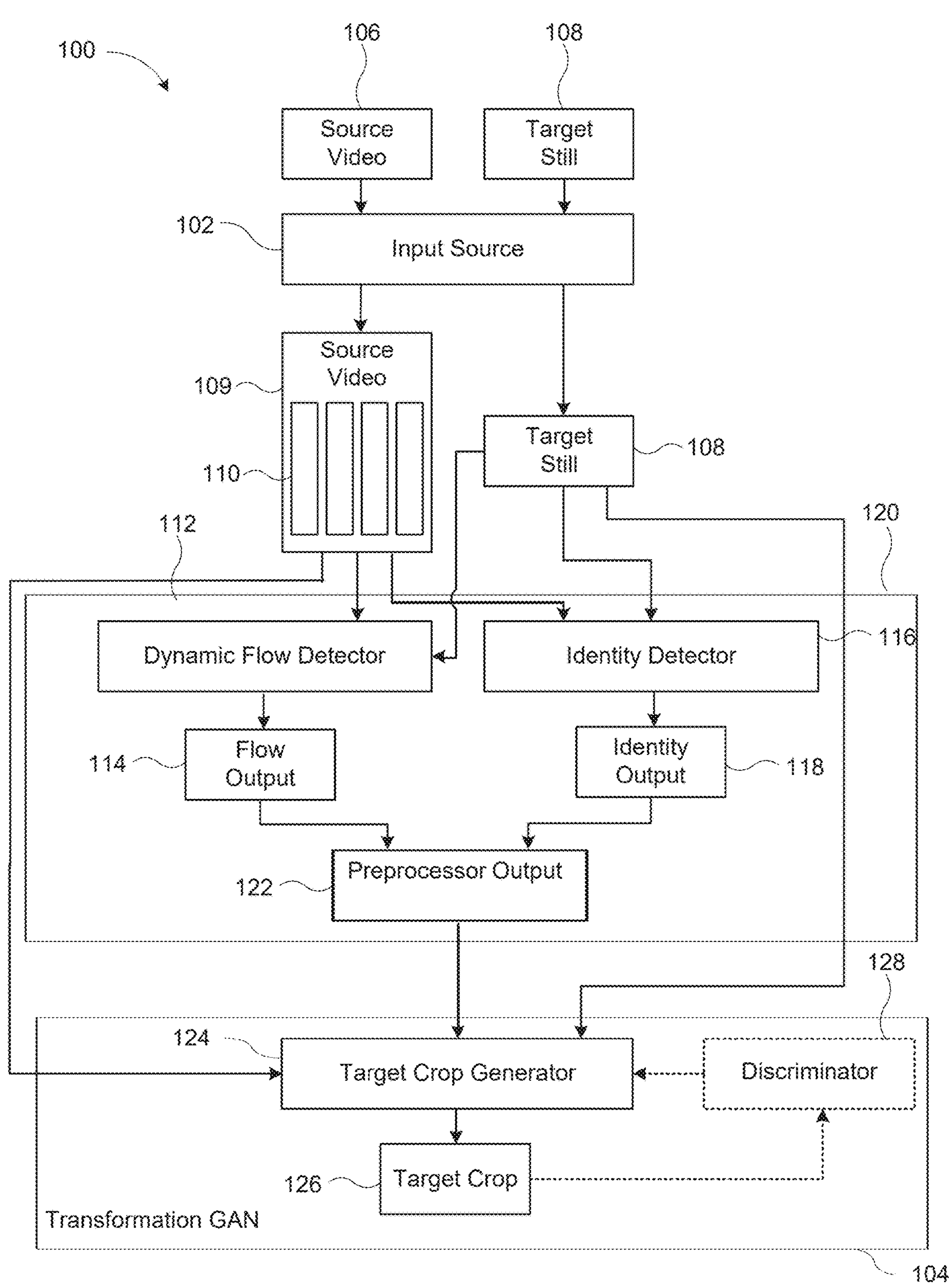
FIG. 1A illustrates a block diagram of a system for media manipulation, according to an embodiment.

In the following detailed description of the preferred embodiments, reference is made to the accompanying drawings, which form a part thereof, and within which are shown by way of illustration specific embodiments by which the invention may be practiced. It is to be understood that other embodiments may be utilized, and structural changes may be made without departing from the scope of the invention.

As used in this specification and the appended claims, the singular forms "a," "an," and "the" include plural referents unless the content clearly dictates otherwise. As used in this specification and the appended claims, the term "or" is generally employed in its sense including "and/or" unless the context clearly dictates otherwise.

In the following description, for the purposes of explanation, numerous specific details are set forth in order to provide a thorough understanding of embodiments of the present technology. It will be apparent, however, to one skilled in the art that embodiments of the present technology may be practiced without some of these specific details. The techniques introduced here can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions which may be used to program a computer (or other electronic devices) to perform a process. The machine-readable medium may include, but is not limited to, floppy diskettes, optical disks, compacts disc read-only memories (CD-ROMs), magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

The phrases "in some embodiments," "according to some embodiments," "in the embodiments shown," "in other embodiments," and the like generally mean the particular feature, structure, or characteristic following the phrase is included in at least one implementation. In addition, such phrases do not necessarily refer to the same embodiments or different embodiments.

The present invention as disclosed herein will become better understood through a review of the following detailed description in conjunction with the figures. The detailed description and figures provide merely examples of the various embodiments of present invention. Many variations are contemplated for different applications and design considerations; however, for the sake of brevity and clarity, all the contemplated variations may not be individually described in the following detailed description. Those skilled in the art will understand how the disclosed examples may be varied, modified, and altered and not depart in substance from the scope of the examples described herein.

Conventional image manipulation may include analysis and training on copious amounts of video and/or image data to distill movement and behavior of a target. This can require a significant amount of time and/or processing power. Frequently, the amount of processing power and/or time required would be prohibitive for most users. Additionally, the appropriate, or useful, media data may not be available or may be difficult to access.

One example of image and video manipulation is in the realm of deep fakes. Because the conventional approaches may require significant time and power, they do not lend themselves to consumer use. Consumers prefer rapid results with a minimized input requirement. Consumers do not wish to upload extensive quantities of media to facilitate a manipulation.

The present invention includes a system and method for overcoming the problems described above. The present invention is configured to receive a source media file and a target media file and manipulate the target media file to contain identifiable attributes contained in the source media file, which were not present in the target media file.

These identifiable attributes include, but are not limited to the dynamics, fluidity, motion/movement, landmarks, anatomical landmarks, audio, and semantic movement information. Moreover, the attributes may be those of the subject in the media files.

A media file refers to a video file or a still image file. These media files can have any file formats known to a person of ordinary skill in the art. The subject of a media file is an identifiable object, person, or animal from which the attributes are identified in the source media file or onto which the attributes are applied in the target media file. The subject in the source file may be the same or different from the target subject.

The present invention is configured to successfully transform/manipulate the target media file when both the source media file and the target media file are previously unseen by the transformation GAN. Moreover, the present invention is configured to successfully transform the target media file based on the source media file when the subject depicted in the target media file and the subject depicted in the source media file are previously unseen by the transformation GAN. Conventional media transformation/manipulation systems require the transformation GAN to train on a mass quantity (thousands to millions) of media files on the target and source subjects before the transformation GAN could successfully create a realistic transformation (e.g., an identifiable error of less than 20%) of the target media file. The present invention, however, has overcome this prohibitive training requirement and can transform the target media file without having ever seen the target subject or the source subject.

The reference to a realistic transformation refers to an error/loss calculation of about 20% or less. In some embodiments, a realistic transformation refers to an error/loss calculation of about 10% or less. The percent error/loss can be calculated using any methods known in the art. In some embodiments, the percent error is calculated by comparing the original target crop to the target crop generated by the transformation GAN. During training the transformation GAN tries to generate a target crop based on an input target crop (same person, different facial expression/orientation). For example, it's the same media file, but the original target crop is from second 1.0 and the transformation GAN tries to generate a crop from second 3.0 based on the first crop and the output from the dynamic flow detector. Thus, during training, the transformation GAN has the target crop to match the one it's trying to generate. The transformation GAN is trying to generate a target crop from second 1.0 that matches the crop at second 3.0, and it has that exact crop at second 3.0 to see how good of a job it did. Once the error is below the threshold, then the generator in the transformation GAN is good enough to be used to transform the target media file of a user.

In some embodiments, the system and method may include a source video and a single target still image. The identifiable attributes, e.g., movement information, of the source subject may be extracted from the source video and used to transform the target subject in the single target still image. While the identifiable attribute in this example is the movement information, alternative attributes can be used in a similar manner.

In some embodiments, the source media file and the target media file are videos. The identifiable attributes, e.g., facial features, of the source subject may be extracted from the source image and used to transform the facial features of the target subject in the target video. The resulting output video file includes the target subject's facial features replaced by the source subject's facial features. While the identifiable attribute in this example includes the subject's facial features, alternative attributes can be used in a similar manner. The primary difference between the embodiment in the previous paragraph is that the input target file is a video, and the output file matches the frames of that target video, but the facial expressions/movements are now changed in the final video to match those of the input source video.

In some embodiments, the source media file is a video, and the target media file is a still image. The identifiable attributes, e.g., lip movement, of the source subject in the source video can be extracted and used to transform the lip movement of the target subject in the target image. The movement of the target subject can then be imported onto the source video. The resulting output video file includes the target subject's face on the body of the source subject in the source video. In addition, the expressions and lip movements of the source subject in the source video are present on the target subject's face in the modified source video. While the identifiable attribute in this example is the lip movement information, alternative attributes can be used in a similar manner.

Figure 1B:
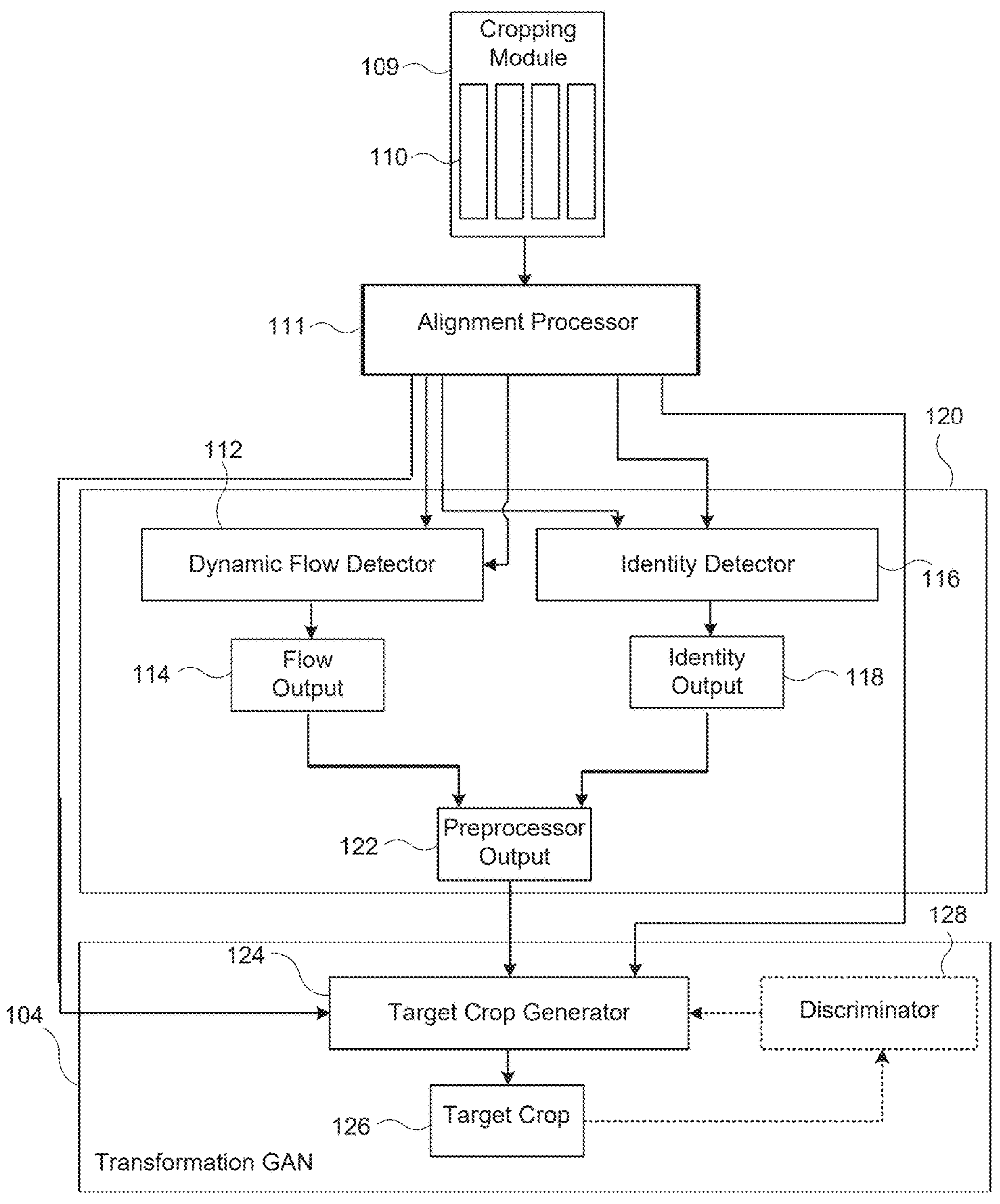
FIG. 1B illustrates a block diagram of a system for media manipulation, according to an embodiment.

FIGS. 1A-1B illustrate block diagrams of a system 100 for media transformation, according to some embodiments. The system includes or communicates with one or more input sources 102, which are configured to provide a source media file 106 and a target media file 108 to a transformation GAN 104. A single input source 102 may provide both the source media file 106 and the target media file 108 or multiple input sources may be used to provide one of the source media file 106 and the target media file 108.

While the exemplary system includes a source video 106 and a target still 108, as previously explained, the source video 106 may be a still image and the target still 108 may be a video. For brevity, FIGS. 1-3 focus on a source media file in the form of a video and the target media file in the form of a still image.

The target still 108 may be a single still image, a series of still images, or a video into which the system 100 will translate some identifiable attribute, e.g., the motion of the subject, in the source video 106. In some embodiments, the target still 108 is an image of a real person in a real setting. In some embodiments, the target still 108 may include a real person in a modified setting. In other embodiments, the target still 108 may be a modified image of the subject. For example, the target still 108 may include age modification, gender modification, makeup filter, and so forth. In some embodiments, the target still 108 may include a generated or synthetic subject in a real, modified, or generated setting. The target media could also include a short audio clip (~1.5 seconds) of a person's voice/speech (real, generated, and/or modified); a short video (~1.5 seconds) of a person's face (real, generated, and/or modified) with movement; a short video (~1.5 seconds) of a person's body or body and face (real, generated, and/or modified) with movement. In some embodiments, the target media depicts a target object rather than a target person.

In some embodiments, the target media file 108 is a time-series cropped version of the input target file. For example, if the source media file 106 is a video, the target media file 108 is an image/still frame or a short video clip. If the source media file 106 is an audio clip, the target media file 108 could be a short audio clip. In some embodiments, the target media files 108 are not cropped from the source media file 106 itself. Target media files 108 differ from source media file 106 in that target media file 108 will offer the identifiable attributes of interest (e.g., characteristic, appearance, and/or identity information) to transformation GAN 104.

In some embodiments, the source video 106 may be a video of a source subject. As previously explained, the source subject may exhibit motion which is to be translated to the target still 108. This translation will be discussed in greater detail below. Other non-limiting examples of a source media file include a video file of a person's face, including talking and facial expression/movement; a video file of a person's full body or body and face including talking, facial/expression movement, and body expression/movement; an audio file of a person talking and/or singing with a real voice; and an audio file of talking and/or singing of a generated voice from TTS.

As shown in FIGS. 1, the input source 102 provides media to a transformation GAN 104. In some embodiments, the transformation GAN 104 may be coupled to the input source 102 to receive the source video 106 and/or the target still 108 from the input source 102. In some embodiments, the input source 102 may capture the source video 106 and/or the target still 108. For example, the input source 102 may include an integrated camera or other recording component. In another example, the input source 102 may include an attached or network camera or other recording device.

In some embodiments, the input source 102 or another component may apply some pre-processing to the source media 106 and/or the target media 108 prior to providing the media to the transformation GAN 108. For example, the input source 102 may slice the source video 106 into source video crops 110, with the resulting slices having a pixel size the same as the original video, a duration of about 1/fps, and an orientation that matches the orientation of the source video. Slicing can be accomplished by first standardizing the video to a desired frames per second, such as 25 fps, using frame dropout, motion interpolation, or other known method, and then separating and saving each frame of the video as a still image, such as a png. In some embodiments, the source video 106 is sliced into the source video crops 110 by the transformation GAN 104.

In some embodiments, the input source 102 may be omitted and the transformation GAN 104 may capture or otherwise handle the source video 106 and/or the target still 108. In some embodiments, the transformation GAN 104 may be wholly or partially implemented on a mobile device. In other embodiments, the transformation GAN 104 may be wholly or partially implemented on a server or other non-mobile resource or computing device.

Some embodiments of the present invention further include one or more preprocessing actions prior to providing the source media files 106 and the target media files 108 to the transformation GAN 104. For example, preprocessing may include, but is not limited to, performing trajectory analysis to extract facial or landmark trajectory, cropping the media files, re-identifying facial landmarks, and then cropping the media files again. These preprocessing actions will be discussed in greater detail in subsequent paragraphs.

As exemplified in FIGS. 1, some embodiments of the present invention include a cropping module 109 and one or more attribute detectors, such as a dynamic flow detector 112, and/or an identity detector 116. The cropping module 109 is configured to crop the media files, while the dynamic flow detector 112 is configured to detect the movement and identity detector 116 is configured to detect identity characteristics of a subject within the media file. Cropping the media files and then detecting changes in the movement and identity characteristics of a subject in the media files significantly enhances the output of the transformation GAN 104 thereby drastically improving the realism of the output transformed target media file.

In some embodiments, the media files are cropped to a predetermined time Δt. For example, the Δt may be 0.033 seconds at 30 frames-per-second. In some embodiments, the Δt may correspond to a single frame. In other embodiments, the Δt may correspond to multiple frames. In some embodiments, the crops 110 may correspond to audio information in the form of mel spectrograms. If the target media file 108 is in the form of a video, the cropping module 109 also crops the target video 108 into target video crops that are in the form of still images or short videos.

As shown in FIG. 1B, some embodiments further include an alignment processor 111 configured to perform preprocessing actions, such as those disclosed in co-pending application 63/250,459, which is incorporated herein by reference for the sake of brevity. The alignment processor 111 is configured to modify the alignment of the subject within the media file so that each crop 110 depicts the subject aligned in the same manner. For example, if crops 110 depict a subject's face in different orientations from one crop to the next, the alignment processor 111 analyzes how the subject's facial landmarks change (relative to each other or other landmarks) in each crop 110 and digitally transforms the orientation of the subject's face in each crop 110 so that the subject's face is in the same orientation in each crop 110. This process can be performed for the subject's entire body or portions of the subject's body, such as the subject's face. The alignment processor 111 may perform these alignment steps on a non-human subject as well.

Following cropping module 109, (and alignment processor 111 in embodiments having alignment processor 111) the crops 110 and/or any still images are provided to the attribute detectors. In the exemplary images, the attribute detectors include a dynamic flow detector 112 and an identity detector 116. Some embodiments include at least one attribute detector. In some embodiments, the at least one attribute detector is the dynamic flow detector 112 or the identity detector 116. In some embodiments, the at least one attribute detector includes both the dynamic flow detector 112 and the identity detector 116.

The dynamic flow detector 112 is configured to track movement data in the media files. In some embodiments, the dynamic flow detector 112 may be configured to intake source video crops 110 in a training mode and in an inference mode. In the training mode, the system 100 may implement machine learning to refine the transformation applied to the source video 106 and the target still 108. In the inference mode, the system 100 may modify the target still 108 to reflect at least some of the movement extracted from the source video 106, which will be explained in greater detail below.

During training, the dynamic flow detector provides movement data to the transformation GAN 104, which encodes the faces and metadata and then tries to decode it to generate realistic images. During this process, transformation GAN 104 generates some movement/motion keypoints in an unsupervised fashion and tries to figure out how to transform the generated image so the keypoints match the desired image with the desired facial expression.

In some embodiments, the dynamic flow detector 112 and/or the transformation GAN 104 may be configured to train on the source video crops 110 without seeing the target media. In other words, the dynamic flow detector 112 uses the same source media file as the input source media and the target media rather than using a set of paired faces from different people. This allows the system to operate without having to first train on the target subject. To explain further, the system learns to transform a first person's face into another expression. Then during inference, it runs on a second person's face, even though it's never seen the second person's face. Moreover, it can use a third person's face to create expressions on the second person's face, even though during training it only saw the first person's face (and potentially more than 50,000 other different people).

As previously stated, in some embodiments, the source video crops 110 may be analyzed to identify movement of a subject through comparison of a plurality of source video crops 110. In some embodiments, the dynamic flow detector 112 may attempt to generate a series of subsequent source video crops 110 by analyzing the previous source video crops 110. Accuracy of the generated crops may be improved iteratively through machine learning.

In some embodiments, the dynamic flow detector 112 is trained in an unsupervised manner. For example, as more images, such as the source video crops 110, are analyzed by the dynamic flow detector 112, machine learning allows the dynamic flow detector 112 to improve the ability to detect identifiable attributes of the subject in the source video crops 110 that indicate motion. In other words, embodiments of the dynamic flow detector 112 automatically extract dynamic flow information from an image, such as the source video crops 110.

The dynamic flow detector 112 is configured to train in an unsupervised manner by identifying landmarks on a first image and second image of the same person. It then uses a series of linear expressions (Taylor expansion, tangent distance, etc.) to predict how to transform landmarks on the first image and second image. It then provides the predictions to the transformation GAN 104, which executes the transformation on the first image and second image based on the provided predictions.

In some embodiments, the dynamic flow detector 112 may enter the inference mode in which the source video crops 110 are analyzed to obtain dynamic flow data to allow motion to be inferred or generated in the target still 108. In the inference mode, the dynamic flow detector 112 may analyze both the source video crops 110 and the target still 108. For example, the dynamic flow detector 112 identifies landmarks for a first image and also for a second image of a different person. The dynamic flow detector 112 predicts how to transform the landmarks from the first image to the second image given the linear/mathematical expressions of the movement. The transformation GAN 104 is provided with the first image and the prediction from the dynamic flow detector 112 and then generates the second image using the subject of first image.

In some embodiments, the dynamic flow detector 112 generates a flow output 114. The flow output 114 may include dynamic flow data which may take the form of a n-dimension landmark heatmap. In some embodiments, the landmark heatmap may include coordinates for one or more identified landmarks or features of a target subject with a corresponding movement or flow metric. In some embodiments, the n-dimension landmark heatmap may include n-number of dynamic flow landmarks which may be predetermined or determined dynamically. Each component of the heatmap may describe an x-coordinate and y-coordinate center of mass that corresponds with dynamic flow or movement. In some embodiments, the heatmap has between approximately five and sixty-eight landmarks. Other examples may include fewer (e.g., 11) or more landmarks.

In some embodiments, the dynamic flow detector 112 may output a segmentation image or other representation of dynamic flow or another movement metric. In some embodiments, the flow output 114 is a segmented image communicating a pixel-by-pixel representation of dynamic flow in the image, like a Mask RCNN. Other representations may be implemented to communicate movement or dynamic flow in an image such as the source video crop 110. In some embodiments, the segmentation image is an m-class segmentation image in which "m-class" describes the number of possible classes that are pre-defined or determined dynamically. The classes can be pre-defined such as "nose," "left-eye," "right-eye," etc. and we set conditions such as nose is in center, left eye is same height as right eye. The classes can also be dynamic in creating a predetermined number of classes and the dynamic flow detector 112 automatically identifies the classes.

Ultimately, the dynamic flow detector 112 mathematically computes the movement of one or more identifiable landmarks from the captured dynamic flow data. In some embodiments, the dynamic flow detector 112 may determine a power series approximation of dynamic flow landmarks. In some embodiments, the power series approximation may be implemented through binomial expansion, Maclaurin series, Fourier series, or so forth. In some embodiments, the dynamic flow detector 112 may apply the post-processing via a random sample consensus method (RANSAC) or least median of squares method (LMedS). Other approaches may also be implemented.

In some embodiments, the dynamic flow detector 112 may be implemented to perform post-processing to improve the flow output 114 or provide additional functionality. For example, the dynamic flow detector 112 can run through all the cropped images in the source video crops 110 and find all the unsupervised landmarks. The dynamic flow detector 112 can then find the frame that best matches the alignment and facial expression of the subject in the target media file 108. The best match is used as the "starter" or "reference" image that matches the target crop. Using this reference image can drastically improve the flow output.

In some embodiments, dynamic flow detector 112 may be configured to apply post-processing to segmentation images through an affine transformation. For example, using tangent distance approximations to determine a difference in the source video crops 110 or in the source video crops 110 and the target still 108. In some embodiments, the post-processing may be iterated to optimize the transformation to be within a target threshold or over a set number of iterations. In some embodiments, the target threshold is less than 5% mean squared error (MSE).

As previously stated, some embodiments include an attribute detector in the form of an identity detector 116. In some embodiments, the identity detector 116 is configured to detect identity aspects of the target still 108 and the source video crops 110. In some embodiments, the identity detector 116 may be configured to determine one or more identity outputs 118. The identity characteristics may be identified using known algorithms and/or machine learning networks preconfigured to identify such attributes.

In some embodiments, the identity outputs 118 correspond to an identity characteristic of the target media file 108 and/or the source media file 106. For example, the identity characteristic may be a gender, hair pattern, facial structure, age, race, or so forth. In some embodiments, the identity detector 116 compares an identity characteristic of the target still 108 with an identity characteristic of the source video crops 110 and outputs computer-readable data capturing the relative identity characteristics between the target media file and the source media file. For example, the identity characteristic data may be in the form of a 128 bit vector that can be read by transformation GAN 104. In other embodiments, another component of the transformation GAN 104 or the input source 12 may receive the identity output 118 and compare the identity characteristic of the target still 108 with the identity characteristic of the source video crops 110.

In some embodiments, the system 100 recognizes or ignores portions of the flow output 114 based on that comparison. For example, if the target still 108 has an identity characteristic of female and the source video crops 110 have an identity characteristic of male, the system 100 may ignore or modify flow outputs 114 corresponding to facial hair. In another example, the system 100 may ignore long hair if it is determined that one of the target still 108 and the source video crops 110 has long hair and the other does not.

In some embodiments, the transformation GAN 104 includes a generative preprocessor 120. In some embodiments, the generative preprocessor 120 may identify portions of the target still 108 to change based on the flow output 114 and the identity output 118 using e.g., a trained neural network built to address optical flow. In some embodiments, the flow output 114 and the identity output 118 are raw outputs that have not yet been postprocessed. In other embodiments, the generative preprocessor 120 may intake a flow output 114 and an identity output 118 as a postprocessing output from the dynamic flow detector 112 and the identity detector 116.

The generative preprocessor 120 may intake at least one of the flow output 114, the identity output 118, a source video crop 110, or the target still 108. As will be explained in subsequent sections, generative preprocessor 120 may also intake input source reference files/characteristics and input target reference files/characteristics. Examples of input data provided to the generative preprocessor 120 include but are not limited to an animated video of a person's face, an animated video of a person's body, an animated video of a person's face and body, and an audio voice/talking/singing file.

In some embodiments, the generative preprocessor 120 intakes an n-dimension landmark heatmap, an m-class segmentation image, or so forth. The generative preprocessor 120 may output a preprocessor output 122 which may include at least one of a vector flow image corresponding to the flow of each pixel or a grayscale missing pixel image. In some embodiments, the grayscale missing pixel image may be a model showing which pixels of the target still 108 remain and which pixels are replaced in applying the dynamic flow to the target still 108.

In some embodiments, the generative preprocessor 120 may identify portions of the target still 108 on a pixel-by-pixel basis. For example, the generative preprocessor 120 may determine a vector for each pixel of the target still 108 that will move. In other words, the generative preprocessor 120 may determine whether a pixel of the target still 108 needs to move based on information extracted from the source video crops 110 and, if the pixel needs to move, the direction and magnitude of the movement. In some embodiments, the generative preprocessor 120 is unsupervised. In other embodiments, the generative preprocessor 120 may be at least partially supervised.

In some embodiments, the system 100 includes a target crop generator 124. The target crop generator 124 acts as the generator in the transformation GAN 104 to create crops of target still 108 referred to as target crops 126. In some embodiments, the target crop generator 124 may be configured to receive at least one of the preprocessor output 122, the target still 108, or the source video crops 110. Depending on the identifiable attribute, crop generator 124 creates target crops 126 in which the identifiable attribute in the target media file is transformed based on the detected changes in the identifiable attribute in the source video crops 110.

For example, the target crop generator 124 may generate target crops based on the dynamic flow extracted from the source video crops 110 within the target still 108. In some embodiments, the transformation GAN 104 intakes at least one of the source video crops 110, the grayscale missing pixel image, the vector flow image, or so forth. The target crop generator 124 uses the data to try to create a realistic target crops 126 that the discriminator 128 believes is real.

In some embodiments, the target crop generator 124 is trained using a first portion of the source video crops 110 to predict a second portion of the source video crops 110. Comparison and adjustment of the target crop generator 124 may be made to the processing implemented by the target crop generator 124 to more accurately predict the second portion of the source video crops 110. For example, the target crops may be compared to the second portion of the source video crops 110 using at least one of pixel-wise Euclidean distance or perceptual distance with a pretrained neural network. The neural network may be trained to minimize losses in the at least one pixel-wise Euclidean distance or perceptual distance. In some embodiments, the target crop generator 124 may be trained or tuned over iterations through a loss determination loop using discriminator 128. For example, through loss determination, the neural network (transformation GAN 104) may learn to generate realistic images from the first portion of the source video crops 110 that match both the dynamic flow of the source video crops 110 and preserve the identity of the target still 108. Loss determination can be determined through loss functions, such as MSE/pixel-loss (e.g., does it match the original image), perceptual loss (e.g., does it look like a real image), facial similarity loss (e.g., does it look like this person), etc.

Upon reaching a predetermined realism, the transformation GAN 104 creates a raw output. The raw output contains the motion of the input source file and the identity of the input target media file. The raw output should be of the same type as the input source media file. As previously noted, the identifiable attributes may vary and thus the raw output could contain alternative or additional transformations on the target media file.

Some embodiments further include post processing the raw output files to create a final output media file. The final output media file is provided to the original user and/or one or more additional users. Some embodiments include more than one post-processing steps. The post processing may either be performed using the input source 102 or the transformation GAN 104. If both the input source 102 and the transformation GAN 104 are used for post-processing, post-processing will be performed on the transformation GAN 104, then the media file will be sent to the input source 102 for further post-processing, and then returned to the user through the input source 102.

Figure 2A:
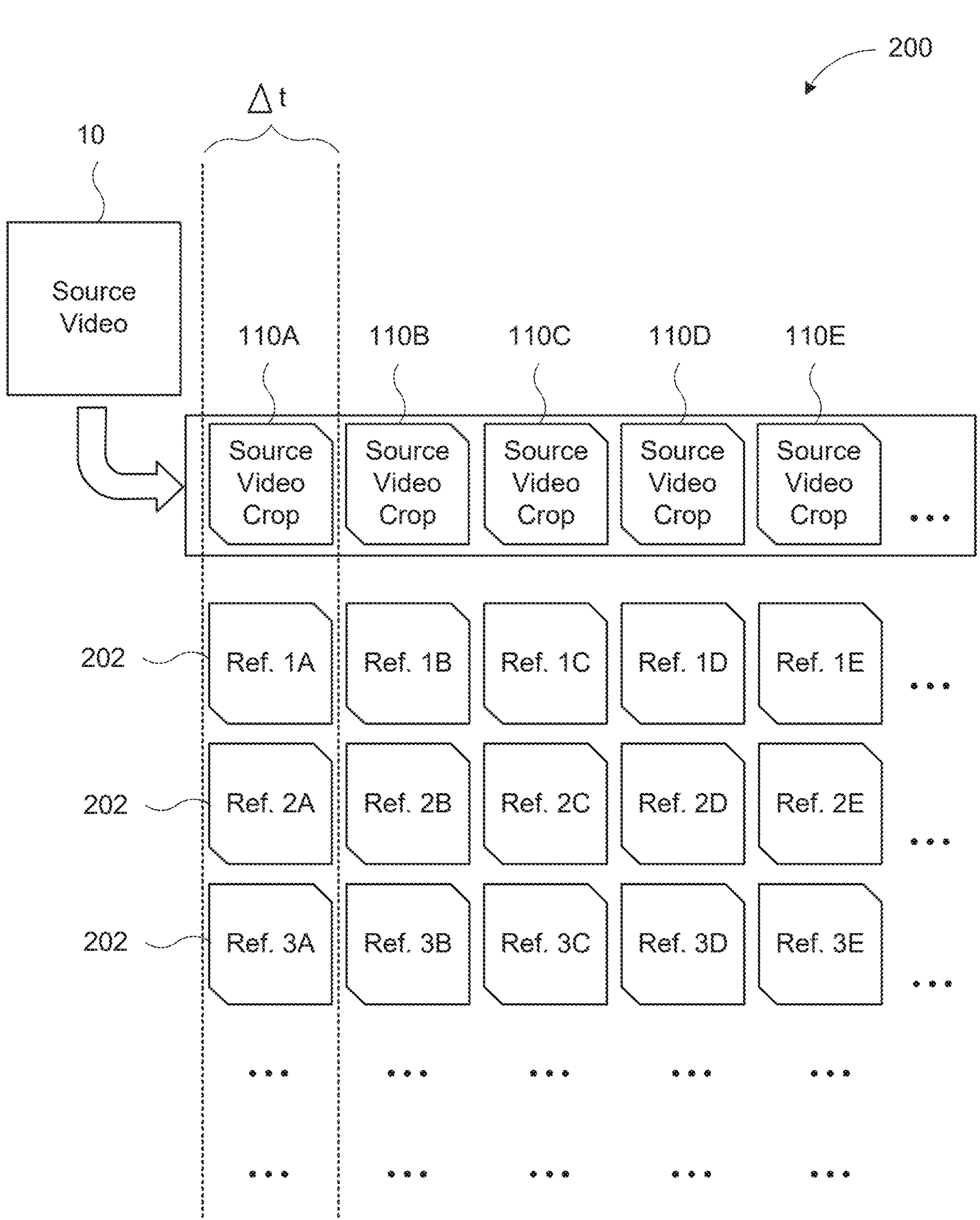
FIG. 2A illustrates a block diagram of a file arrangement for single image manipulation, according to an embodiment.
Figure 2B:
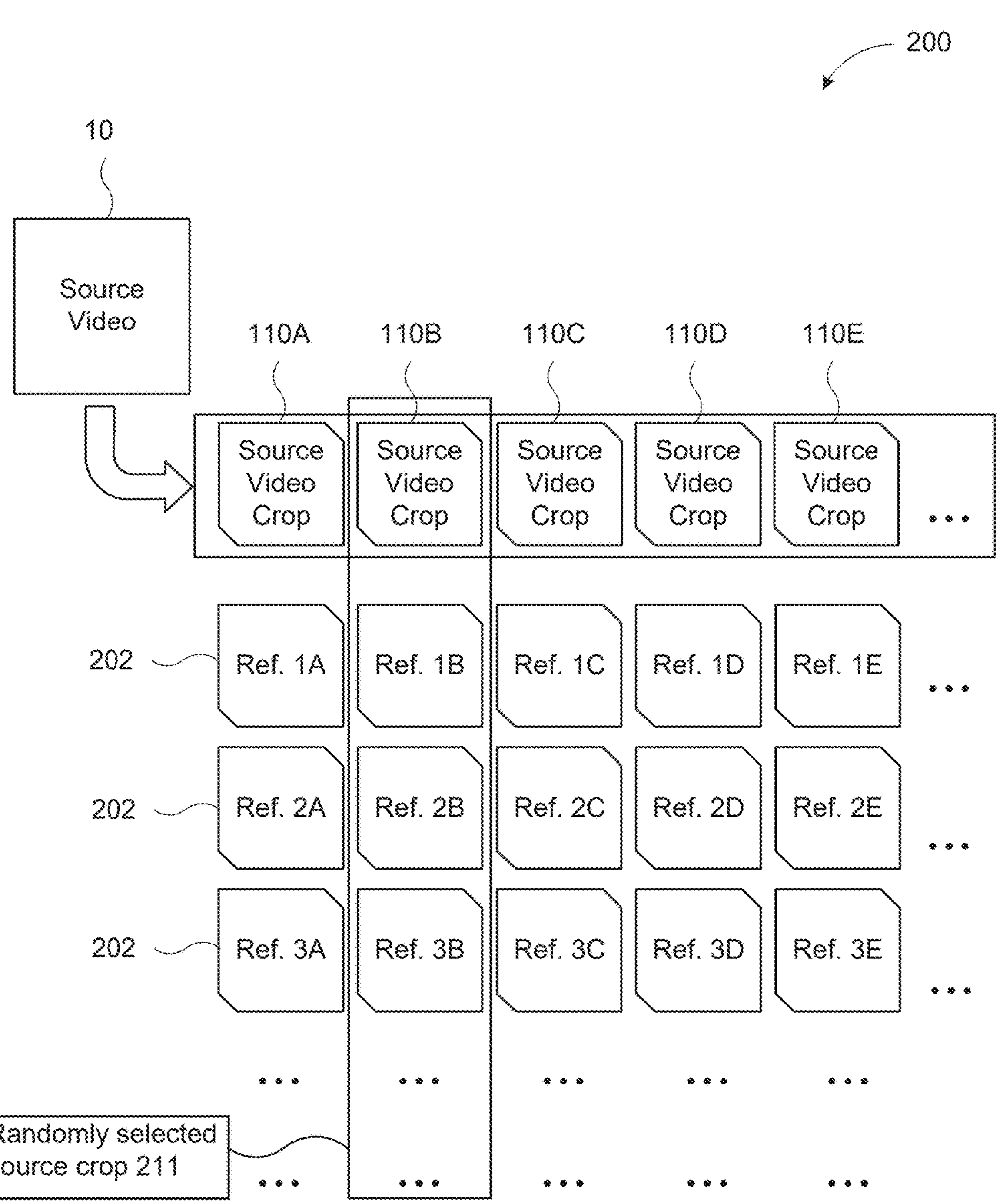
FIG. 2B illustrates a block diagram of a file arrangement for single image manipulation in which a cropping is selected as a source crop for training according to an embodiment.
Figure 2C:
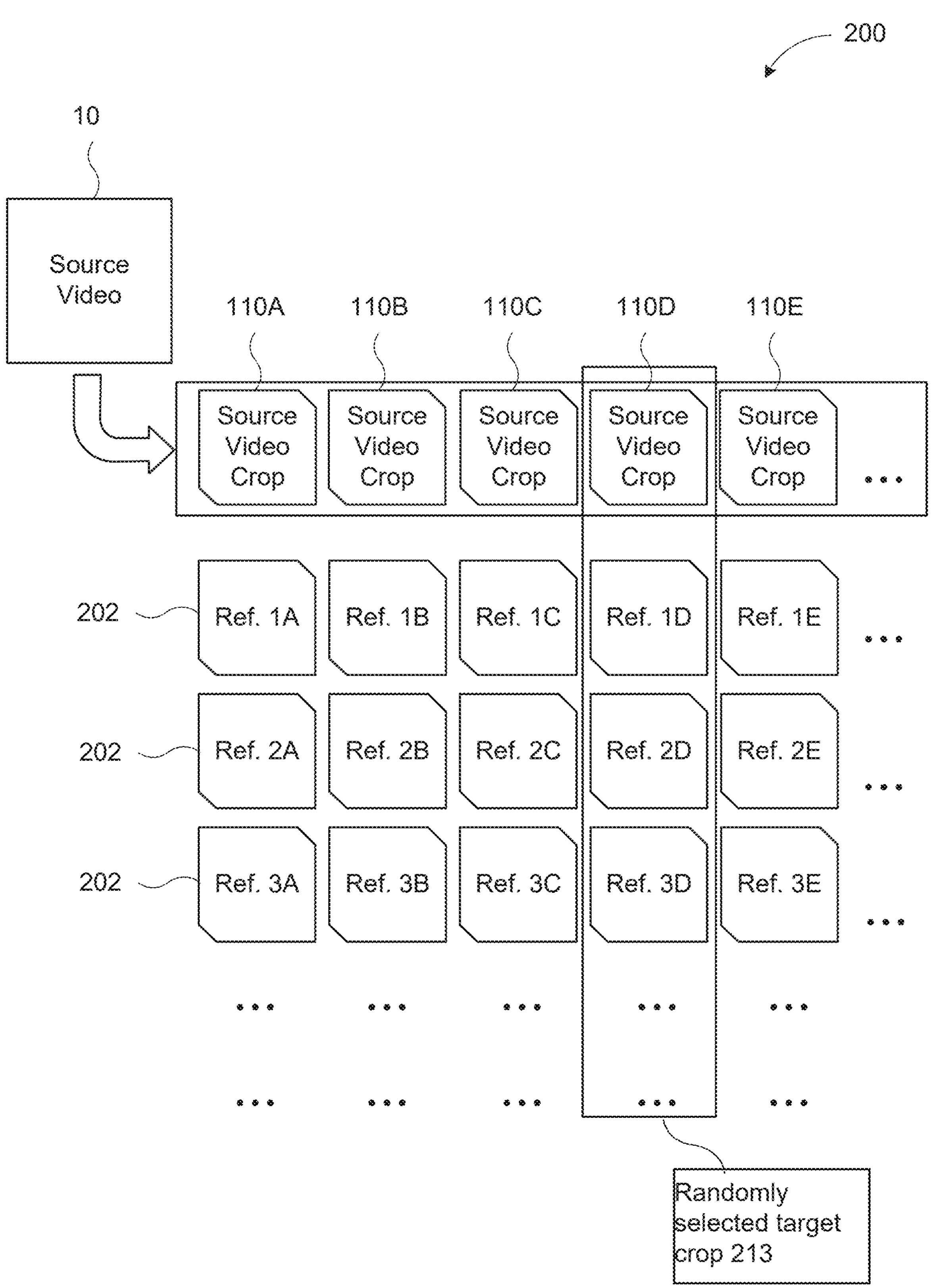
FIG. 2C illustrates a block diagram of a file arrangement for single image manipulation in which a cropping is selected as a target crop for training according to an embodiment.

Some embodiments of the present invention further include an attribute subdivider that is configured to recognize and track a particular identifiable attribute throughout the various cropped files of a media file. For example, FIG. 2A illustrates a block diagram of a file arrangement 200 for dynamic flow detection, according to an embodiment. In some embodiments, the file arrangement 200 allows for extraction of reference files 202 for each source video crop 110.

In some embodiments, the system 100 may organize identifiable attributes extracted from the source video crops 110 into reference files 202. For example, a first source video crop 110A may be associated with a first reference file 1A. The first reference file 1A may store, reference, or other correlate to at least one of identifiable attribute, such as identity information or motion/dynamic flow information of the subject. For example, reference 1A may correspond to a gender of the subject captured in the source video. If the source media file is a static image, the reference is repeated in the same manner.

In some embodiments, the reference file 202 may be consistent through multiple source video crops 110A-E. For example, a gender or facial hair characteristic may be consistent through an entire source video 106 resulting in a consistent reference file 202 through all source video crops 110. In other embodiments, a reference file 202 may correspond to less than all of the source video crops 110. For example, the reference file 202 may correspond to an audio characteristic such as a raspy quality, a melodic quality, a deep or high quality, or so forth. If the effect or characteristic is temporary, the reference file 202 may correspond to some but not all of the source video crops 110. In some embodiments, each reference file 202 may persist across all source video crops 110 but may have different values. For example, the reference file 1A-1E may be a vocal timbre value which may change over the course of the source video 106 and from one source video crop 110 to another. In this example, the value may be a first value in a first reference file 1A and a different value in a second reference file 1D. In some embodiments, the reference files 202 may be persistent and updated based on the identifiable attribute of the corresponding source video crop 110. In other embodiments, the reference files 202 may be generated in response to detection of an identifiable attribute of the corresponding source video crop 110. In some embodiments, the reference files 202 may be in json, txt, pickle, tfrecord, or any such format.

In some embodiments, the reference files 202 are generated by the system 100 using attribute detection algorithms known in the art. In some examples, the reference files 202 are generated by a machine learning component. In other examples, the reference files 202 are generated manually. The reference files 202 may be generated by the input source 102 or by the transformation GAN 104. In some embodiments, the reference files 202 are optional. In some embodiments, the reference files 202 may improve the performance of the system 100 in translating motion from the source video 106 to the target still 108.

In some embodiments, one or more of the reference files 202 correspond to a video characteristic of the source video 106. In other embodiments, the reference files 202 correspond to an audio characteristic of the source video 106. In some embodiments, the reference files 202 correspond to a motion component. In other embodiments, the reference files 202 correspond to an identity component. In some embodiments, the reference files 202 correspond to both identity and motion components. In some embodiments, one or more of the reference files 202 may correspond to a face, body, pose, talking, singing, non-verbals, or other audio, or so forth. In some embodiments, the reference files 202 may be configured as computational vectors. In some embodiments, the reference files 202 may be saved as videos, json files, or so forth. In some embodiments, at least one of the reference files 202 may include data corresponding to an audio characteristic. In other embodiments, at least one of the reference files 202 includes data corresponding to a visual characteristic. In some embodiments, at least one of the reference files 202 includes both data corresponding to an audio characteristic and data corresponding to a visual characteristic.

In some embodiments, each reference file 202 corresponds to a single source video crop. In other embodiments, a reference file 202 may correspond to a multiple source video crops 110. For example, a single reference file 202 may be stored in memory and associated with multiple source video crops 110. In another example, a single reference file 202 may be stored in memory to correspond with a source video crop 110 and be copied to another location in memory to correspond with another source video crop 110.

For embodiments that organize identifiable attributes extracted from the source video crops 110 into reference files 202, the reference files are provided to the attribute detectors. Each attribute detector determines changes in the corresponding attribute as provided in the reference files from one crop to the next. These changes are captured as computer-readable data and are ultimately provided to the transformation GAN 104.

Some embodiments also use the reference files to train the transformation GAN 104 on each identifiable attribute. Referring now to FIGS. 2B-2G, transformation GAN 104 randomly selects a series of reference files corresponding to one of the crops 110, which acts as the source crop 211 for training. As provided in FIG. 2C, transformation GAN 104 randomly selects a different series of reference files corresponding to one of the crops 110, which acts as the target crop 213 for training. Each of the target and source reference files 211, 213 are then provided to the attribute detectors to detect changes in the attributes.

Figure 2D:
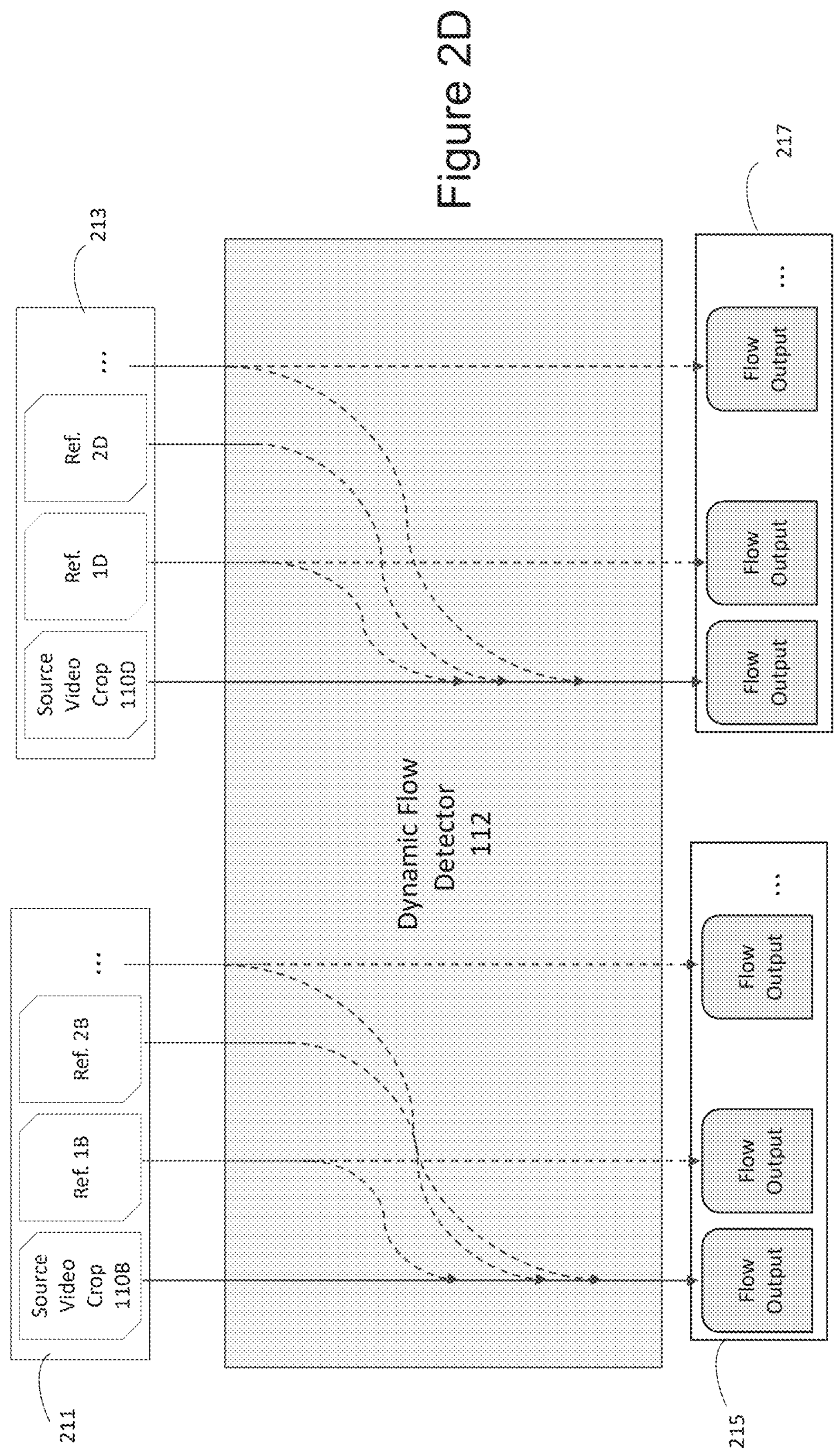
FIG. 2D is a block diagram illustrating the process of detecting movement using the dynamic flow detector.

As provided in FIGS. 2D and 2H, the attribute detectors may be the dynamic flow detector 112 and the identity detector 116, however, additional or alternative attribute detectors may be used. As shown in FIG. 2D, each of the source and target reference files 211, 213 are run through the dynamic flow detector 112, which produces flow output data, including the flow output data 215 corresponding to the source files 211 and the flow output data 217 corresponding to the target files 211.

Figure 2E:
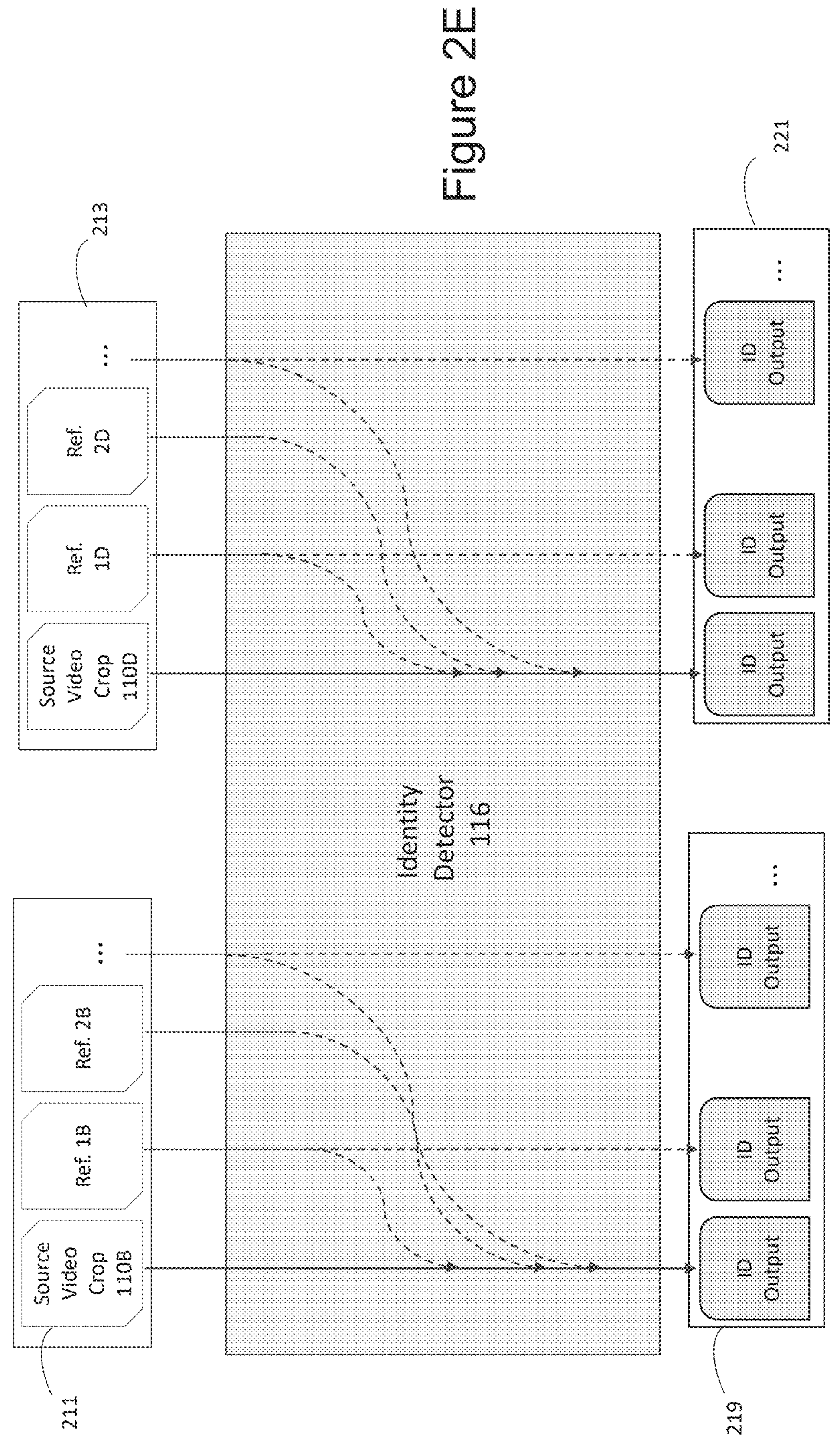
FIG. 2E is a block diagram illustrating the process of detecting identity characteristics using the identity detector.

Likewise, as shown in FIG. 2E, each of the source and target reference files 211, 213 are run through the identity detector 116, which produces identity output data, including the flow output data 219 corresponding to the source files 211 and the flow output data 221 corresponding to the target files 211.

Figure 2F:
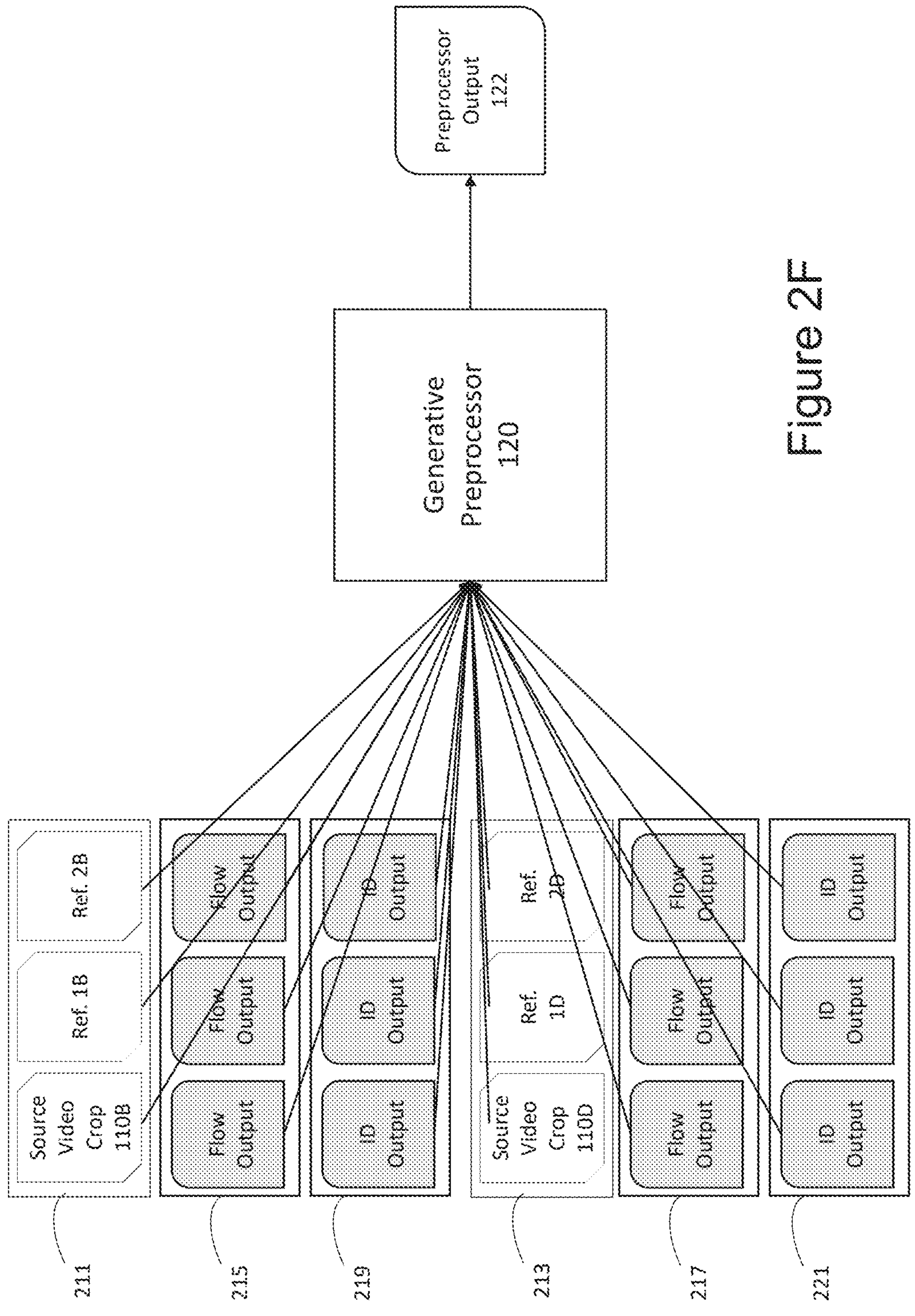
FIG. 2F is a block diagram illustrating the process of providing media files to the generative preprocessor.
Figure 2G:
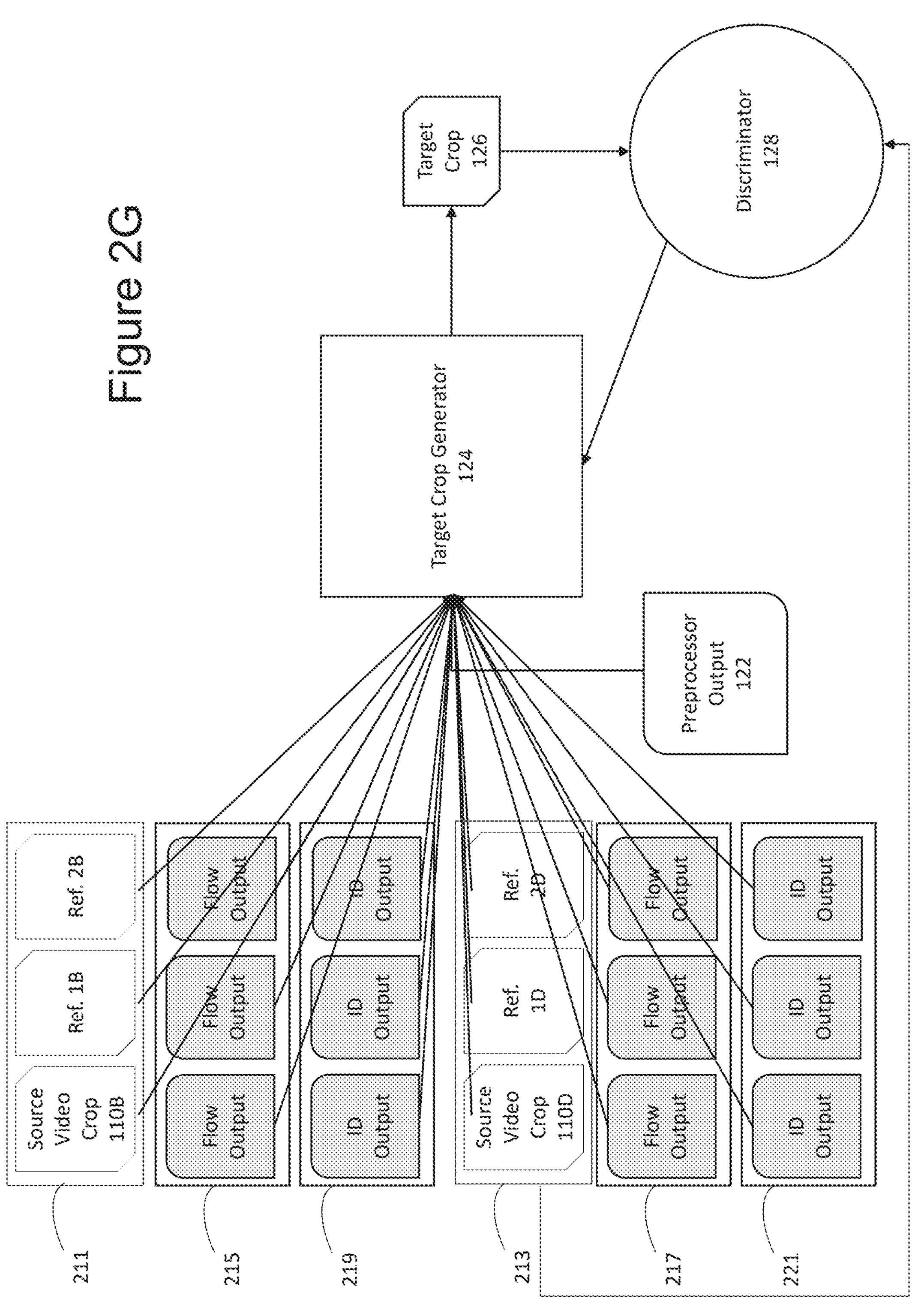
FIG. 2G is a block diagram illustrating the process of providing media files to the target crop generator.

Then, as shown in FIG. 2F, all of the input files 211, 213 and output files 215, 219, 217, 221 are provided to the generative preprocessor 120. The generative preprocessor detects changes in attributes and produces preprocessor output 122. As exemplified in FIG. 2G, all of the input files 211, 213 and output files 215, 219, 217, 221 are provided to the target crop generator 124 along with the preprocessor output 122. The target crop generator 124 produces a target crop 126, which is provided to discriminator 128. Discriminator 128 analyzes the target crop 126 in view of the target reference file 213 to calculate a loss determination. This loss determination is provided to the target crop generator 124 until the loss determination meets a loss threshold, the user stops transformation GAN 104, or transformation GAN 104 meets a predetermined threshold of iterations. At this point, the transformation GAN 104 is sufficiently trained.

Transformation GAN 104 can then be used to receive input source media files and input target media files to produce a transformed target crop 126. As previously explained, some embodiments, further include post processing to further transform the final target crop 126 prior to providing the transformed media file to the user.

Figure 3:
FIG. 3 illustrates a flow diagram of a method for manipulating a target still to include movement, according to an embodiment.
Figure 3:
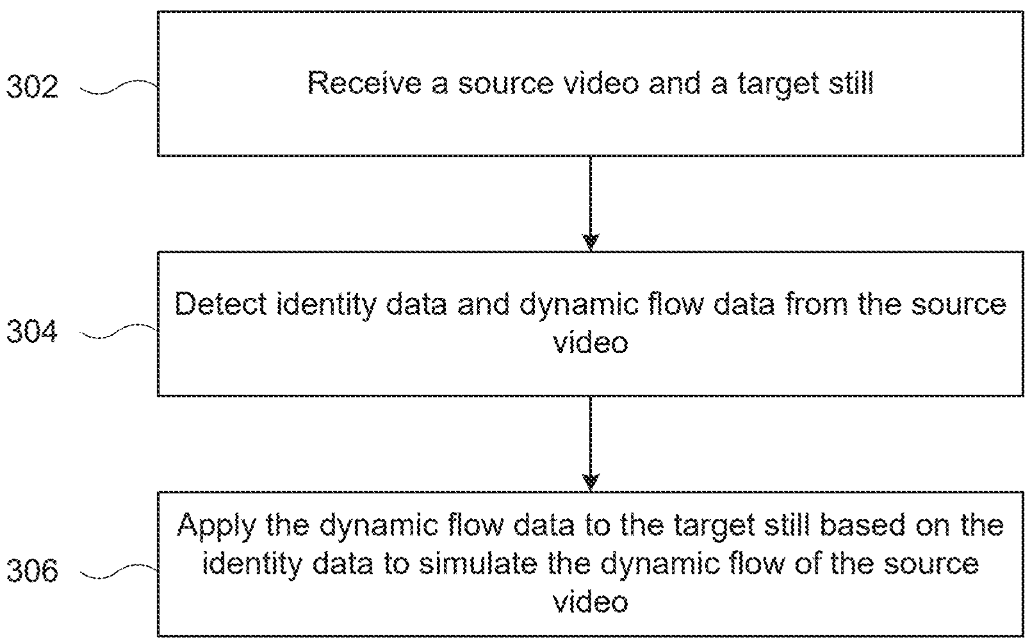

FIG. 3 illustrates a flow diagram of a method 300 for manipulating a target still to include movement. In some embodiments, the method 300 includes, receiving a source video and a target still (Block 302). In some embodiments, source video and the target still may be provided from the same source. In other embodiments, the source video and the target still may be provided from different sources. In some embodiments, a user may generate the source video and supply the target still. For example, the user may record the source video and download a target still. In some embodiments, the user may generate both the source video and the target still. For example, the user may record the source video and capture the target still. In other embodiments, the user may obtain both the source video and the target still from an outside resource.

The method 300 may also include detecting identity data and dynamic flow data from the source video. In some embodiments, the identity data may be generated from an analysis of the source video. In some embodiments, identity data may be generated for the target still. The dynamic flow data may correspond to movement detected in the source video. The dynamic flow data may be on a pixel-by-pixel basis. In some embodiments, the dynamic flow may be based on landmarks within the source video and/or the target still.

The method 300 may also include applying the dynamic flow data to the target still based on the identity data to simulate the dynamic flow of the source video (Block 306). In some embodiments, the identity data from the source video may be compared to the identity data from the target still to determine the dynamic flow data to apply and how to apply it. For example, identity data which conflicts may be used to block or modify dynamic flow data in application on the target still. In some embodiments, dynamic flow data for characteristics, landmarks, or other aspects may be included if corresponding identity data is not conflicted between the source video and the target still.

Examples of Transformations

Some embodiments of step 306 include animating a still target image 108 based a video source file 106. The target crop generator 124 outputs a video of the same size/shape as target still image 108 and the same length as the source video

106. The output may include animating the face from the target still image 108 given the facial landmarks in the source video 106. The end result is a video of the face from the target still image 108 with the new facial animations. For embodiments in which the alignment processor 111 altered the alignment of the subject in the source video crops 110, the output video is post-processed to undo the cropping and aligning actions of the alignment processor 111 so that the transformed target face is aligned back into the original target image in the generated video of the target with the new facial animations.

Some embodiments of step 306 include animating a target video 108 based a video source file 106. The target crop generator 124 outputs a video of the same size/shape as target video 108 and the same length as the source video 106. The output video may include animating the face in the target video 108 based on the facial animations in the source video 106. The end result is a transformed version of the target video 108 with the face in the target video 108 with new facial animations taken from the source video 106.

For embodiments with the alignment processor 111, both the target video 108 and the source video 106 are altered to adjust the alignment of the subject in the respective video crops 110. In addition, during inference of the transformation GAN 104, the system cycles through the cropped frames from the target trajectory. Normally the system would continue to the use the same frame over and over again because the target media file is a single, still image of the target. But when the target media file is a video, the system cycles through frames of the target video, so post-processing the end result back into the target video seems natural. When the output video is post-processed, the cropping and aligning actions of the alignment processor 111 are reversed for the target video on a frame-by-frame basis. Because the system cycled through frames in the generative stage, it now undoes the cropping and aligning actions for each frame that matches the input to the generator. All frames will be aligned appropriately upon output.

Now consider animating a still image or video and adding face-swap into the original media file. The target media file may be a still image or a video. The source media file is a video. The output media is also a video having the same size/shape/length as source video. The system animates the face as in the previous two examples, but also applies post-processing to put the generated output back into the source video (not the target image or video). The primary difference in this example from the other two previous examples is in post-processing. During post processing, the system reverses the cropping and aligning actions of the alignment processor 111 of the target face back into the source video, frame by frame. The "face swap" of the target face into the source video is performed using the process disclosed in co-pending application 63/250,459, which is incorporated herein by reference, which results in previously unachievable realism. The end result is a super-effective, one-shot face swap system.

Figure 4:
FIG. 4 illustrates a screenshot of an application implementing the system, according to an embodiment.

FIG. 4 illustrates a screenshot 400 of an application implementing the system 100, according to an embodiment. Some embodiments may allow a user to record a video for manipulation of a still image.

In the illustrated screenshot 400, the application may allow a user to select a still image (shown in the bubble at the bottom of the screenshot) to modify. The user may record a video in the screen to provide a source video supplying motion for the modification of the still image.

A feature illustrated in one of the figures may be the same as or similar to a feature illustrated in another of the figures. Similarly, a feature described in connection with one of the figures may be the same as or similar to a feature described in connection with other figures. The same or similar features may be noted by the same or similar reference characters unless expressly described otherwise. Additionally, the description of a particular figure may refer to a feature not shown in the particular figure. The feature may be illustrated in and/or further described in connection with another figure.

Elements of processes (i.e., methods) described herein may be executed in one or more ways such as by a human, by a processing device, by mechanisms operating automatically or under human control, and so forth. Additionally, although various elements of a process may be depicted in the figures in a particular order, the elements of the process may be performed in one or more different orders without departing from the substance and spirit of the disclosure herein. The foregoing description sets forth numerous specific details such as examples of specific systems, components, methods and so forth, in order to provide a good understanding of several implementations. It will be apparent to one skilled in the art, however, that at least some implementations may be practiced without these specific details. In other instances, well-known components or methods are not described in detail or are presented in simple block diagram format in order to avoid unnecessarily obscuring the present implementations. Thus, the specific details set forth above are merely exemplary. Particular implementations may vary from these exemplary details and still be contemplated to be within the scope of the present implementations.

Related elements in the examples and/or embodiments described herein may be identical, similar, or dissimilar in different examples. For the sake of brevity and clarity, related elements may not be redundantly explained. Instead, the use of a same, similar, and/or related element names and/or reference characters may cue the reader that an element with a given name and/or associated reference character may be similar to another related element with the same, similar, and/or related element name and/or reference character in an example explained elsewhere herein. Elements specific to a given example may be described regarding that particular example. A person having ordinary skill in the art will understand that a given element need not be the same and/or similar to the specific portrayal of a related element in any given figure or example in order to share features of the related element.

It is to be understood that the foregoing description is intended to be illustrative and not restrictive. Many other implementations will be apparent to those of skill in the art upon reading and understanding the above description. The scope of the present implementations should, therefore, be determined with reference to the appended claims, along with the full scope of equivalents to which such claims are entitled.

The foregoing disclosure encompasses multiple distinct examples with independent utility. While these examples have been disclosed in a particular form, the specific examples disclosed and illustrated above are not to be considered in a limiting sense as numerous variations are possible. The subject matter disclosed herein includes novel and non-obvious combinations and sub-combinations of the various elements, features, functions and/or properties disclosed above both explicitly and inherently. Where the disclosure or subsequently filed claims recite "a" element, "a first" element, or any such equivalent term, the disclosure or claims is to be understood to incorporate one or more such elements, neither requiring nor excluding two or more of such elements.

As used herein "same" means sharing all features and "similar" means sharing a substantial number of features or sharing materially important features even if a substantial number of features are not shared. As used herein "may" should be interpreted in a permissive sense and should not be interpreted in an indefinite sense. Additionally, use of "is" regarding examples, elements, and/or features should be interpreted to be definite only regarding a specific example and should not be interpreted as definite regarding every example. Furthermore, references to "the disclosure" and/or "this disclosure" refer to the entirety of the writings of this document and the entirety of the accompanying illustrations, which extends to all the writings of each subsection of this document, including the Title, Background, Brief description of the Drawings, Detailed Description, Claims, Abstract, and any other document and/or resource incorporated herein by reference.

As used herein regarding a list, "and" forms a group inclusive of all the listed elements. For example, an example described as including A, B, C, and D is an example that includes A, includes B, includes C, and also includes D. As used herein regarding a list, "or" forms a list of elements, any of which may be included. For example, an example described as including A, B, C, or D is an example that includes any of the elements A, B, C, and D. Unless otherwise stated, an example including a list of alternatively-inclusive elements does not preclude other examples that include various combinations of some or all of the alternatively-inclusive elements. An example described using a list of alternatively-inclusive elements includes at least one element of the listed elements. However, an example described using a list of alternatively-inclusive elements does not preclude another example that includes all of the listed elements. An example described using a list of alternatively-inclusive elements does not preclude another example that includes a combination of some of the listed elements. As used herein regarding a list, "and/or" forms a list of elements inclusive alone or in any combination. For example, an example described as including A, B, C, and/or D is an example that may include: A alone; A and B; A, B and C; A, B, C, and D; and so forth. The bounds of an "and/or" list are defined by the complete set of combinations and permutations for the list.

Where multiples of a particular element are shown in a FIG., and where it is clear that the element is duplicated throughout the FIG., only one label may be provided for the element, despite multiple instances of the element being present in the FIG. Accordingly, other instances in the FIG. of the element having identical or similar structure and/or function may not have been redundantly labeled. A person having ordinary skill in the art will recognize based on the disclosure herein redundant and/or duplicated elements of the same FIG. Despite this, redundant labeling may be included where helpful in clarifying the structure of the depicted examples. The Applicant(s) reserves the right to submit claims directed to combinations and sub-combinations of the disclosed examples that are believed to be novel and non-obvious. Examples embodied in other combinations and sub-combinations of features, functions, elements and/or properties may be claimed through amendment of those claims or presentation of new claims in the present application or in a related application. Such amended or new claims, whether they are directed to the same example or a different example and whether they are different, broader, narrower or equal in scope to the original claims, are to be considered within the subject matter of the examples described herein.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. A method of manipulating digital media, comprising:

receiving a target media file, wherein the target media file is a still image that includes a target subject;

receiving a source media file, wherein the source media file is a video that includes a source subject;

cropping the target media file to produce a series of cropped target media files depicting the target subject in an unaltered state;

cropping the source media file to produce a series of cropped source media files;

for each cropped source media file, identifying a predetermined identifiable attribute of the input source subject;

determining, by an attribute detector, changes in the identifiable attribute of the source subject between the series of cropped source media files and storing the determined changes as computer-readable data;

providing at least a generator from a transformation generative adversarial network (GAN), wherein the transformation GAN has been trained on at least one reference subject, and the target subject and the source subject are not intentionally the same as the at least one reference subject on which the transformation GAN has been trained;

providing the computer-readable data of the changes in the identifiable attribute of the source subject between the series of cropped source media files to a generative processor neural network and the generator;

providing at least one of the cropped target media files to the generative preprocessor neural network;

the generative preprocessor neural network producing a preprocessor output that includes at least one of: (i) a vector flow image corresponding to a flow of each pixel of at least one cropped target media file, and (ii) a grayscale missing pixel image identifying pixels of at least one cropped target media file to be replaced;

providing the preprocessor output to the generator, the generator producing a transformed media file based at least in part on the preprocessor output, wherein the transformed media file includes the source video with the source subject replaced with the target subject, wherein a corresponding set of identifiable attributes of the target subject are altered based on the changes in the identifiable attribute of the source subject between the series of cropped source media files; and outputting a final transformed media file.

2. The method of claim 1, wherein the attribute detector is a dynamic flow detector configured to detect movement of at least a portion of the source subject between two or more cropped source media files.

3. The method of claim 1, wherein the attribute detector is an identity detector configured to detect changes in identity characteristics of the source subject between two or more cropped source media files.

4. The method of claim 1, wherein:

identifying the predetermined identifiable attribute includes identity characteristics and movement of at least a portion of the source subject between two or more cropped source media files; and the attribute detector includes both:

an identity detector configured to detect changes in the identity characteristics of the source subject between two or more cropped source media files; and a dynamic flow detector configured to detect the movement of at least the portion of the source subject between two or more cropped source media files.

5. The method of claim 1, wherein the source subject and the target subject are different.

6. The method of claim 1, wherein the transformation GAN has been trained on at least 50,000 media files and in comparing the transformed media file to the source media file during training, a percent error between one or more features of the target subject in the transformed media file and the source subject in the source media file was less than or equal to 20% error.

7. The method of claim 1, wherein the transformation GAN has not previously trained on the target subject.

8. The method of claim 1, further including creating reference files for each cropped source media files, wherein each reference file corresponds to an identifiable attribute and the step of determining changes in the identifiable attribute of the source subject is performed on each reference file.

9. The method of claim 1, further including analyzing the cropped source media files and determining which of the cropped source media files includes the source subject most similarly aligned to the alignment of the target subject in the target media file.

10. The method of claim 9, further including analyzing the cropped source media files and determining which of the cropped source media files includes the source subject with the most similar facial expression to the target subject in the target media file.

11. The method of claim 10, further including identifying the cropped source media file with the most similar subject alignment and facial expression as a starter image to be provided to the generator.

12. The method of claim 1, further including aligning the cropped source media files so that a face of the source subject is forward facing in each of the cropped source media files.

13. The method of claim 12, further including further transforming the final transformed media file to reverse the aligning that was performed on the cropped source media files.

14. A media transformation system, comprising:

an input source, the input source configured to provide a target media file and a source media file, wherein the target media file includes a target subject, and the source media file includes a source subject;

wherein the target media file is a still image and the s ace media file is a video;

a cropping module configured to crop the source media file to produce a series of cropped source media files and crop the target media file to produce a series of cropped target media files depicting the target subject in an unaltered state;

a first attribute detector configured to identify changes in identity characteristics of the source subject between two or more cropped source media files and store the determined changes as computer-readable data;

a generator from a transformation generative adversarial network (GAN), wherein the transformation GAN has been trained on at least one reference subject and the target subject and the source subject are not intentionally the same as the at least one reference subject on which the transformation GAN has been trained;

a generative preprocessor neural network configured to generate a preprocessor output based at least in part on the computer-readable data and the series of cropped target media files, the preprocessor output including at least one of: (i) a vector flow image corresponding to a flow of each pixel of at least one cropped target media file, and (ii) a grayscale missing pixel image identifying pixels of at least one cropped target media file to be replaced, the generator configured to receive the computer-readable data of the changes in the identifiable attribute of the source subject between the series of cropped input source media files, and to receive the series of cropped target media files depicting the target subject in the unaltered state;

the generator further configured to receive the preprocessor output;

the generator configured to produce a transformed media file based at least in part on the preprocessor output, wherein the transformed media file includes the source video with the source subject replaced with the target subject, wherein a corresponding set of identifiable attributes of the target subject are altered based on the changes in the identifiable attribute of the source subject between the series of cropped source media files;

wherein the system outputs a final transformed media file to a user.

15. The system of claim 14, further including a second attribute detector in the form of a dynamic flow detector configured to detect movement of at least a portion of the source subject between two or more cropped source media files.

16. The system of claim 14, further includes:

a reference file generator configured to create reference files for each cropped source media files, wherein each reference file corresponds to an identifiable attribute; and at least a second attribute detector configured to determine changes in at least a second identifiable attribute of the source subject.

17. The system of claim 14, further including an alignment processor configured to align the cropped source media files so that a face of the source subject is forward facing in each of the cropped source media files.

18. A method of manipulating digital media, comprising:

receiving a target media file, wherein the target media file includes a target subject;

cropping the target media file to produce a series of cropped target media files depicting the target subject in an unaltered state;

receiving a source media file, wherein the source media file includes a source subject that is different from the target subject;

wherein the source media file is a video;

cropping the source media file to produce a series of cropped source media files;

for each cropped source media file, identifying a predetermined identifiable attribute of the input source subject;

identifying changes in identity characteristics of the source subject between two or more cropped source media files and storing the determined changes in identity characteristics as computer-readable data;

detecting movement of at least a portion of the source subject between two or more cropped source media files and storing the determined changes in movement as computer-readable data;

providing at least a generator from a transformation generative adversarial network (GAN), wherein the transformation GAN has been trained on at least one reference subject and the target subject and the source subject are not intentionally the same as the at least one reference subject on which the transformation GAN has been trained;

providing the computer-readable data of the changes in the identity characteristics to the generator;

providing the computer-readable data of the changes in movement to the generator;

providing the series of cropped target media files to the generator;

providing the computer-readable data of the changes in the identity characteristics, the computer-readable data of the changes in movement, and the series of cropped target media files to a generative preprocessor neural network configured to generate a preprocessor output that includes at least one of: (i) a vector flow image corresponding to a flow of each pixel of at least one cropped target media file, and (ii) a grayscale missing pixel image identifying pixels of at least one cropped target media file to be replaced, providing the preprocessor output to the generator;

producing, by the generator, a transformed media file based at least in part on the preprocessor output and the provided data corresponding to changes in movement and identity characteristics, wherein the transformed media file includes the source video with the source subject replaced with the target subject, wherein a corresponding set of identifiable attributes of the target subject are altered based on the changes in the identifiable attribute of the source subject between the series of cropped source media files; and outputting a final transformed media file to a user.

* * * * *